May 31, 1960 — H. R. JOHNSON — 2,938,748
UTILITY CART

Filed Sept. 29, 1959 — 2 Sheets-Sheet 1

INVENTOR.
HAROLD R. JOHNSON,
BY
ATTORNEY

May 31, 1960
H. R. JOHNSON
2,938,748
UTILITY CART
Filed Sept. 29, 1959
2 Sheets-Sheet 2
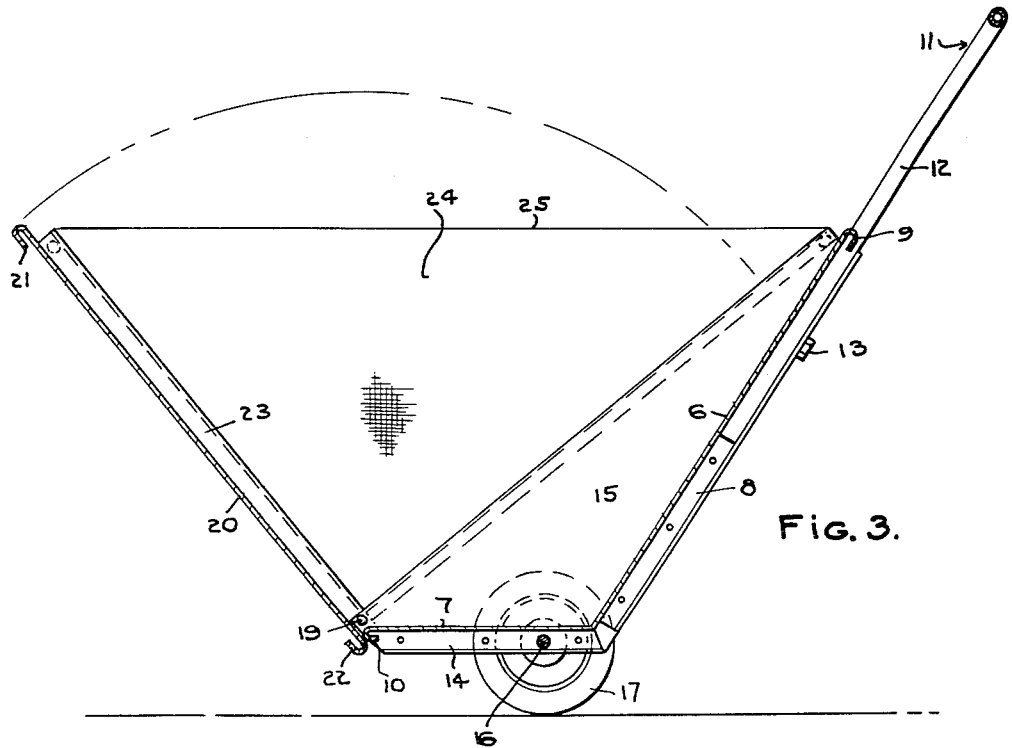
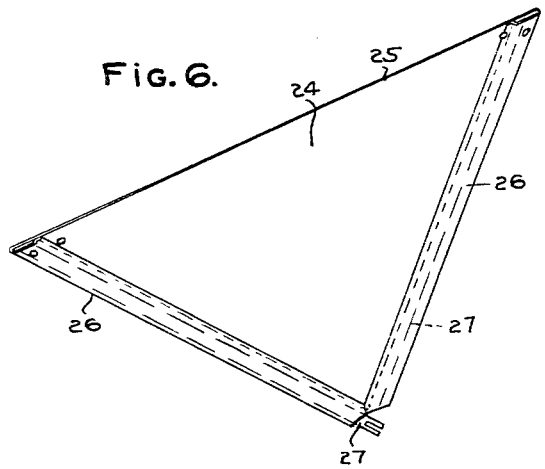
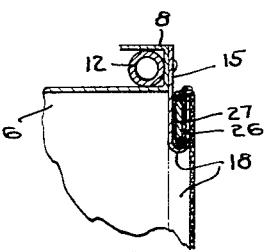
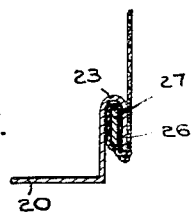
INVENTOR.
HAROLD R. JOHNSON,
BY
*James H. Ogles*
ATTORNEY 2,938,748

UTILITY CART

Harold R. Johnson, 1818 10th Ave., Lake Worth, Fla.

Filed Sept. 29, 1959, Ser. No. 843,108

3 Claims. (Cl. 296—27)

This invention relates to a utility cart and has particular reference to a novel form of cart having a main body portion and a hingedly connected apron that is movable toward and from the body portion to collapse the cart into a relative convenient size for storage or the like.

The invention comprises a cart having a main body portion that is fabricated from sheet aluminum to form a back section, a connected bottom and tri-angular panels that are also connected to the body and with the back being provided with a handle, while the bottom is provided with a pair of ground wheels together with an outwardly swinging sheet aluminum apron that is hingedly connected to the forward edge of the bottom and with the apron and the panels being connected by fabric panels that are foldable inwardly when the apron is swung toward the body portion for collapsing the cart into a relatively small size.

The cart of the present invention, when in an extended position provides a receptacle of relatively large capacity, having many uses for hauling bulky materials, such as laundry, leaves or the like and with the ground wheels being so disposed as to create a well balanced receptacle that may be easily moved from place to place.

Novel features of construction and operation of the device will be more clearly apparent during the course of the following description, reference being had to the accompanying drawings, wherein has been illustrated a preferred form of the device and wherein like characters of reference are employed to denote like parts throughout the several figures.

Figure 1:
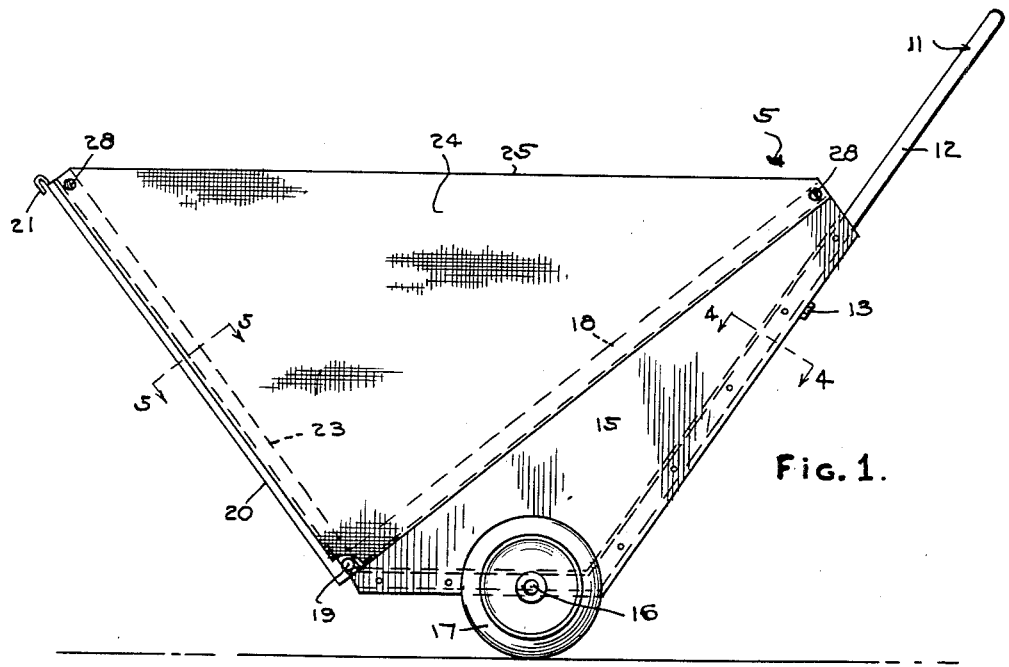
Figure 2:
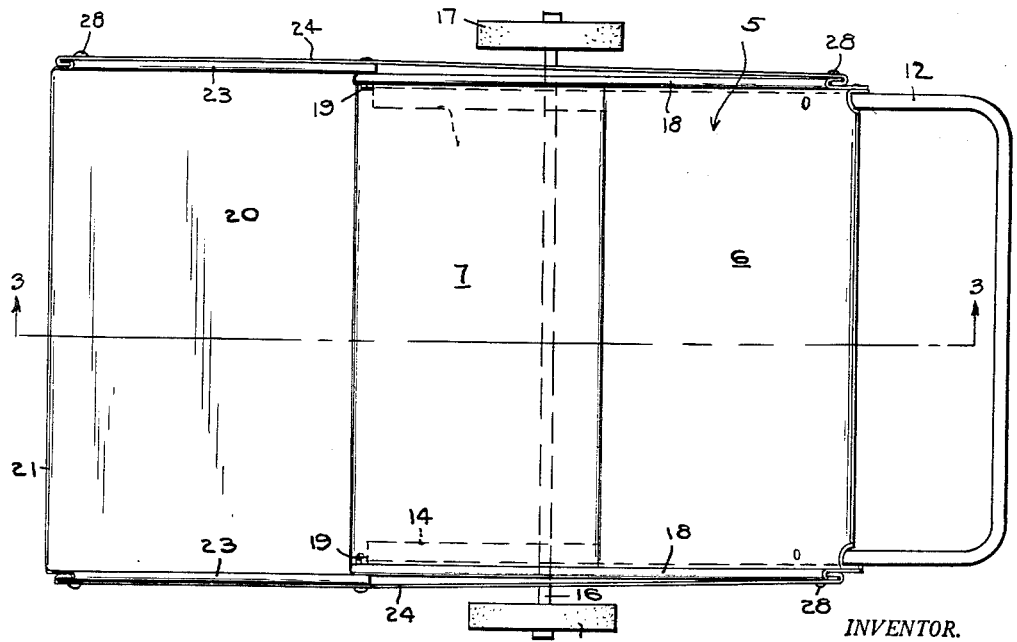

Referring specifically to the drawings:

Figure 1 is a side elevation of a cart constructed in accordance with the invention, Figure 2 is a plan view thereof, Figure 3 is a central vertical longitudinal section taken substantially on line 3—3 of Figure 2, Figure 4 is a fragmentary section taken on line 4—4 of Figure 1, Figure 5 is a fragmentary section taken on line 5—5 of Figure 1 and, Figure 6 is a perspective view of one fabric side panel.

Referring specifically to the drawings, the numeral 5 designates a cart as a whole, embodying a back panel 6 and a bottom panel 7, angled with respect to each other and formed of a continuous sheet of aluminum. The vertical edges of the back panel 6 are bent rearwardly to channel form as indicated at 8, while its top edge is rolled, as at 9. The bottom 7 at its free forward edge is rolled at 10 and with the rolls 9 and 10 serving to rigidly support the panels against flexing. The back panel 6 is provided with a handle 11, of tubular material and U-shaped and with the legs 12 engaging into the channels 8 and bolted thereto, as at 13. The ends of the bottom panel 7 are bent downwardly and inwardly to form a channel 14. Fixedly connected to the sides of the back panel 6, to overlie the bending of the channel 8 and to overlie the bending of the channel 14, are tri-angular side panels 15. The panels 15 are also formed of sheet aluminum and are bolted or riveted in fixed relation to the back and bottom 6 and 7 and whereby to form a triangular receptacle that is of rigid construction. Extending transversely of the bottom 7, to be journaled in the channels 14 and to extend outwardly through preformed openings in the channel and the panels 15, is an axle 16, the axle 16 at its outer ends carry preferably rubber tired ground wheels 17 and whereby the cart may be shifted in a horizontal plane.

The free edges of the side panels 15, are bent to channel form, as clearly indicated in Figure 4 at 18. Hingedly connected at 19 to the lower end of the channel 18, is a sheet aluminum apron 20, the upper and lower edges of the apron 20 are bent to channel form or rolled, as indicated at 21 and 22, to remove any sharp edges and with the roll 22 adapted to roll around the roll 10, when the apron is swung in a vertical plane toward the body portion 5. The apron 20 along its marginal edge is bent to U-shape, forming a channel 23.

Adapted to be detachably connected within the channels 18 and 23, are flexible and preferably canvas side panels 24, shown particularly in Figure 6. The panel 24 is of tri-angular form having a straight upper edge 25. The diagonal edges of the panel 24 is provided with hems 26, receiving flat bars 27. The bars, when engaged in the hems 26, are inserted into the respective channels 18 and 23 and secured thereto by threaded fastening devices 28. One bar 27 is forked at its lower end to have forked engagement with the hinge pins 19. The panels can and or may be removed or replaced in a convenient manner, simply by removing the screws 28 and slipping the hems 26 and their supported bars 27 out of the channels 18 and 23.

In the use of the device, with the body portion 5 being connected with the apron 20 by the hinge pins 19, the bars 27 are then engaged into the hems 26 and folded inwardly into the channels 18 and 23. The forward bar 27 is first shifted downwardly in the channel 23 so that its forked lower end engages the hinge pins 19, after which the screws 28 are engaged through the outer side of the marginal portion of the fabric panels and through preformed openings in the outer walls of the channels 18 and 23 to have threaded engagement into the bars. The apron may then be swung outwardly to form a relatively large capacity receptacle. The arrangement of parts is such that, when the apron 20 is swung outwardly, the fabric panels 24 are held relatively taut, forming a longitudinally tri-angular receptacle that is so proportioned as to be well balanced when shifted upon the ground wheels 17, requiring no undue pressure downwardly upon the handle 11 by the operator. When the device is to be stored, the apron 20 is swung upwardly and rearwardly toward the body of the cart and with the fabric panels being folded inwardly, permitting the apron 20 to lie substantially parallel with the marginal edges of the side panels 15, permitting the cart to assume a fully collapsed position that is proportioned to be supported against a wall or hung upon a suitable bracket by the handle 11. The proportions of the cart in the collapsed position is such that it may be stored in a relatively small closet or the like. The structure is formed of polished aluminum, with the exception of the fabric panels 24 and is highly resistant to corrosion. When the device is to be placed in operation, the operator merely swings the apron 20 forwardly, causing the fabric panels to be extended to form the additional side closures for the cart with the end panels 15.

It will be apparent from the foregoing that a very novel form of utility cart has been provided, the structure is simple, is strong, durable easily shifted from an operative to an inoperative position and is so balanced that a very considerable load may be placed therein without undue effort of the operator in moving the device in a horizontal plane.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. A utility cart of the character described that comprises a body portion of sheet metal that embodies a back portion and a bottom that is angularly disposed with respect to each other and that is formed integral, sheet metal ends for the body portion that are tri-angularly arranged and whereby to maintain the body portion in the angular relation, the forward marginal edges of the ends being outwardly channeled, a shaft extending beneath the bottom and that projects at the opposite ends of the bottom to receive a pair of ground wheels, a sheet metal apron that is hingedly connected with respect to the body portion and with the hinges being adjacent to a forward edge of the bottom, the opposite marginal edges of the apron being outwardly channeled, the said apron being shiftable from an outward angled position with respect to the bottom to an overlying relation and parallel with the marginal edges of the ends, tri-angular fabric panels that have a straight upper edge and with the tri-angular edges being provided with hems, reinforcing bars disposed in the hems, the said hems and the reinforcing bars adapted to have interfitting engagement into the channels of the ends and the channels of the apron, the said fabric panels determining the degree of outward angle for the apron with respect to the body portion and means for detachably connecting the said hems and the bars into the several channels, the said fabric panels being foldable inwardly when the apron is shifted to an overlying relation with respect to the marginal edges of the ends and whereby the apron will be wholly disposed within the cart and a handle device that is connected with the back to project thereabove and whereby to propel the cart.

2. The structure according to claim 1 wherein the channels of the ends are rearwardly facing and the channels of the apron are forwardly facing, the bars for the hems of the fabric panels as disposed in the channels of the apron being forked at their lower ends to engage the hinges and screw devices passing through the fabric and an opening formed in the outer wall of the flanges adjacent the upper ends of the flanges and with the screw devices having threaded engagement within an opening formed in the upper ends of the bars.

3. The structure according to claim 1 wherein the back along its vertical edges is provided with rearwardly extending and opposed channels, the said bottom at its opposite ends being provided with downwardly extending opposed channels, the said shaft being journaled in openings formed in the last named channels, the said apron at its point of hinging being closely adjacent to the forward edge of the bottom, the said back having an upper rolled edge and the said apron being rolled along its upper edge, the said ends being riveted to the channels of the back and the channels of the bottom, the said handle being formed tubular and U-shaped and with the legs of the handle being disposed within the channels of the back and means to bolt the handle within the last named channels against displacement.

References Cited in the file of this patent

UNITED STATES PATENTS

| | | |
|---|---|---|
| 1,520,532 | Clark | Dec. 23, 1924 |
| 2,431,834 | Sinclair | Dec. 2, 1947 |
| 2,437,029 | Howard | Mar. 2, 1948 |
| 2,519,146 | Marshall | Aug. 15, 1950 |